United States Patent
Kashyap

(10) Patent No.: US 11,310,112 B2
(45) Date of Patent: Apr. 19, 2022

(54) AUTOMATIC SERVER CONFIGURATION USING A SWITCH

(71) Applicant: LENOVO ENTERPRISE SOLUTIONS (SINGAPORE) PTE. LTD., Singapore (SG)

(72) Inventor: Vivek Kashyap, Portland, OR (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 52 days.

(21) Appl. No.: 16/370,313

(22) Filed: Mar. 29, 2019

(65) Prior Publication Data

US 2020/0313958 A1 Oct. 1, 2020

(51) Int. Cl.
*H04L 12/24* (2006.01)
*H04L 29/08* (2006.01)
*H04L 41/082* (2022.01)
*H04L 67/568* (2022.01)
*H04L 41/08* (2022.01)

(52) U.S. Cl.
CPC ........ *H04L 41/082* (2013.01); *H04L 41/0886* (2013.01); *H04L 67/2842* (2013.01)

(58) Field of Classification Search
CPC .............. H04L 41/082; H04L 41/0886; H04L 67/2842; H04L 41/0846; H04L 41/0843; H04L 67/34

See application file for complete search history.

(56) References Cited

U.S. PATENT DOCUMENTS

| 9,191,275 | B1 * | 11/2015 | Worsley | G06F 11/30 |
| 9,632,806 | B1 * | 4/2017 | Righi | G06F 9/44505 |
| 10,732,961 | B1 * | 8/2020 | Madasamy | G06F 8/658 |
| 2006/0143432 | A1 * | 6/2006 | Rothman | H04L 67/2842 713/2 |
| 2011/0088082 | A1 * | 4/2011 | Locker | G06F 21/575 726/5 |
| 2013/0091536 | A1 * | 4/2013 | Manjunath | H04L 63/10 726/1 |
| 2013/0246564 | A1 * | 9/2013 | Lee | H04L 67/1095 709/217 |
| 2013/0254325 | A1 * | 9/2013 | Song | G06F 16/24552 709/213 |
| 2014/0258700 | A1 * | 9/2014 | England | G06F 21/51 713/2 |
| 2019/0121648 | A1 * | 4/2019 | Li | G06F 3/0655 |
| 2020/0034237 | A1 * | 1/2020 | Suryanarayand | G06F 9/4416 |
| 2020/0159634 | A1 * | 5/2020 | Gadgil | G06F 11/2094 |

* cited by examiner

*Primary Examiner* — Yves Dalencourt
*Assistant Examiner* — Kamal Hossain

(57) ABSTRACT

Automatic server configuration by a switch may include determining, by a firmware interface application of the switch, a configuration pattern for a plurality of servers; generating, by a network caching application of the switch, a network cache; receiving, based on the configuration pattern, a solution stack; storing the solution stack in the network cache; and providing, from the network cache, the solution stack to the plurality of servers.

20 Claims, 6 Drawing Sheets

AUTOMATIC SERVER CONFIGURATION USING A SWITCH

BACKGROUND

Field of the Invention

The field of the invention is data processing, or, more specifically, methods, apparatus, and products for automatic server configuration by a switch.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Existing solutions for setting up a rack-based server configuration require the use of an active orchestrator. Moreover, each server of the rack-based server configuration must have their respective portions of a solution stack installed from a source. This requires extensive user overhead in individually configuring each server, and requires extensive computational and network overhead for each server to connect to and download portions of the solution stack from a source.

SUMMARY

Automatic server configuration by a switch may include: determining, by a firmware interface application of the switch, a configuration pattern for a plurality of servers; generating, by a network caching application of the switch, a network cache; receiving, based on the configuration pattern, a solution stack; storing the solution stack in the network cache; and providing, from the network cache, the solution stack to the plurality of servers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
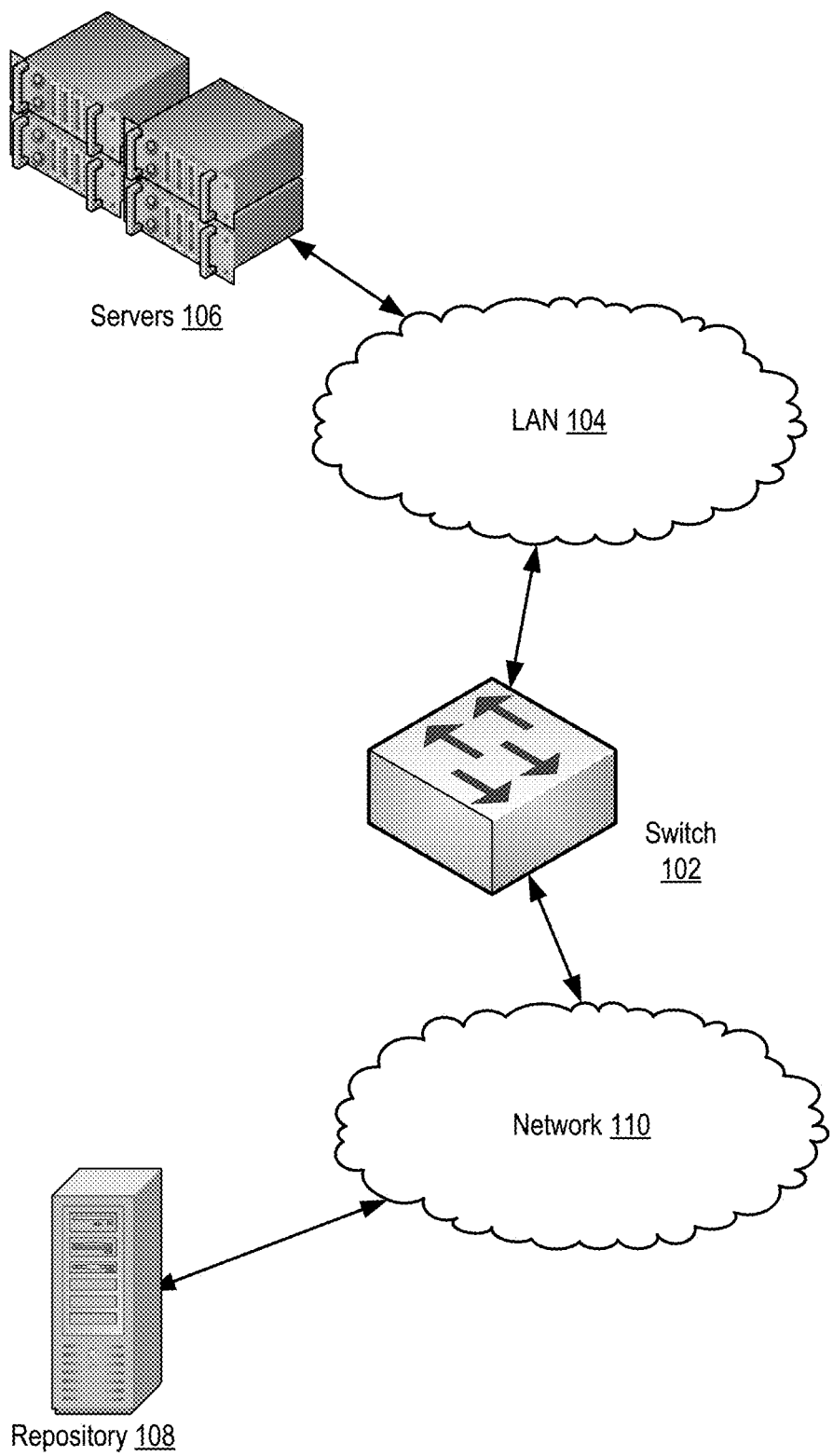
FIG. 1 is a diagram of an example system for automatic server configuration by a switch.

Exemplary methods, apparatus, and products for automatic server configuration by a switch in accordance with the present invention are described with reference to the accompanying drawings, beginning with FIG. 1. FIG. 1 sets forth a network diagram of a system configured for automatic server configuration by a switch according to embodiments of the present invention. The system of FIG. 1 includes a switch 102 which establishes a local area network (LAN) 104 connecting a plurality of servers 106. In this example, the servers 106 may comprise a rack configuration, and the switch 102 may comprise a Top-of-Rack (ToR) switch 102. The switch 102 may also be configured to connect with a repository 108 via a network 110. The network 110 may comprise one or more local area networks (LANs), wide area networks (WANs), personal area networks, mesh networks, cellular networks, internets, intranets, or other networks as can be appreciated.

The repository 108 comprises one or more computing devices (e.g., servers, etc.) configured to store and provide one or more portions of a solution stack for the servers 106. The solution stack may comprise, for example, operating systems, software, services, files, or other data for installation and storage on the servers 106. The portions of the solution stack may be provided by the repository 108 as source code for compilation by one or more of the servers 106. The portions of the solution stack may also be provided as executable files, application packages, virtual machine instances, etc. The portions of the solution stack may also be provided as one or more disk images (e.g., a "golden image" comprising a configuration for one or more of the servers 106.) The solution stack may also be provided as one or more bootable partitions (e.g. Extensible Firmware Interface (EFI) partitions) that comprise boot loaders or kernel images for installing one or more portions of the solution stack.

In order to configure the servers 106, the switch 102 may determine a configuration pattern for the servers 106. The configuration pattern indicates what software, operating systems, data, etc. are included in a particular solution stack for the servers 106. The configuration pattern may also indicate which portions of the solution stack should be installed on a particular server 106. The configuration pattern may also indicate disk configurations (e.g., Redundant Array of Independent Disk (RAID) configurations, partition configurations) for the servers 106. In other words, the configuration pattern describes the solution stack as it should be installed on the servers 106.

Determining the configuration pattern may comprise determining the configuration pattern by a firmware interface application of the switch 102. A firmware interface is a software program that connects the firmware of a computing device (e.g., the switch 102) to an operating system of the computing device. For example, the firmware interface may comprise a Universal Extensible Firmware Interface (UEFI). A firmware interface application is an application, module, service, or other functionality executed within the firmware interface (e.g., a UEFI application). As the firmware interface is launched when a device initially boots, before handoff to the operating system, the firmware interface application may be configured to be executed during the boot process of the switch 102.

Determining the configuration pattern may comprise receiving, via a user interface generated by the firmware interface application, one or more user inputs describing the configuration pattern. For example, the user interface may facilitate a selection of one or more operating systems, applications, services, etc. for inclusion in the solution stack of the servers 106. Determining the configuration pattern may also comprise selecting, according to a user input or a default selection, a predefined configuration pattern. The predefined configuration pattern may be stored on the switch 102 or a disk storage device communicatively coupled to the switch 102 (e.g., hard drives, network attached storage (NAS) drives, etc.). The predefined configuration pattern may also be stored in the repository 108. Accordingly, the firmware interface application may request, from the repository 108, a configuration pattern according to a user input or a default selection.

The switch 102 may then generate a network cache. The network cache comprises a data cache accessible by the one or more servers 106 and stored in the switch 102 or disk storage coupled to the switch 102. For example, the switch 102 may generate the network cache by a network caching application executed within the switch 102. The network caching application may comprise a firmware interface application (e.g., a UEFI application). The network caching application may also comprise a container (e.g., a Linux™ container), a kernel virtual machine (KVM), or another virtual machine. The network caching application may be preinstalled on the switch 102 (e.g., as a component of the UEFI, as stored in an EFI partition) or downloaded by the switch 102 via the network 110 (e.g., from the repository 108 or another source).

The switch 102 may receive, based on the configuration pattern, a solution stack. Receiving the solution stack may comprise requesting the solution stack from the repository 108. For example, the switch 102 may determine, based on the configuration pattern, one or more operating systems, software applications, services, or other solution stack components and request the solution stack components from the repository 108. The repository 108 may then provide the determined solution stack components to the switch 102 as source code, binaries, archive files, bootable partitions (e.g., EFI partitions), etc. The switch 102 may also request a particular disk image (e.g., a "golden image") comprising the components of the solution stack from the repository 108.

After receiving the solution stack, the switch 102 stores the solution stack in the network cache (e.g., via the network caching application and/or the firmware interface application). The switch 102 then provides the solution stack to the plurality of servers 106 from the network cache. Providing the solution stack to the servers 106 may comprise copying one or more bootable partitions to one or more of the servers 106 and then reboot the one or more servers 106. On reboot, the one or more servers 106 will load the bootable partitions which may initiate a boot chain for installing the respective portions of the solution stack for the one or more servers 106. For example, the boot chain initiated by the bootable partitions may cause the one or more servers 106 to request portions of the solutions stack (e.g., from the repository 108). As the solution stack is stored in the network cache of the switch 102, the switch 102 may then provide the requested portions of the solution stack from the network cache. Thus, the servers 106 avoid the computational and network overhead required in each server 106 communicating with the repository 108.

Providing the solution stack to the plurality of servers 106 may also comprise providing the complete solution stack to a first server 106 of the plurality of servers 106 and portions of the solution stack to one or more second servers 106 according to the configuration pattern. For example, the switch 102 may provide, to the first server 106, a disk image (e.g., a "golden image") comprising the complete solution stack. The switch 102 may also provide, to the first server 106, a bootable partition configured to initiate a boot chain installing the entire solution stack on the first server 106. The switch 102 may then copy bootable partitions or other data to the one or more second servers 106 to facilitate installation of the respective portions of the solution stack on the one or more second servers 106. The first server 106 and one or more second servers 106 may request portions of the solution stack which are provided by the switch 102 from the network cache. This further avoids the computational and network overhead required in each server 106 communicating with the repository 108.

The switch 102 may also receive a request from another switch 102 (e.g., a secondary switch 102 connecting another plurality of servers 106 in a rack configuration) for the configuration pattern. For example, the secondary switch 102 may be configured to automatically configure the other plurality of servers 106 according to the solution stack. The switch 102 may then provide the configuration pattern to the secondary switch 102. The secondary switch 102 may also request the solution stack (e.g., from the repository 108). The switch 102 may receive the request from the secondary switch 102 and provide the solution stack from the network cache. The secondary switch 102 may then provide the solution stack to the other plurality of servers 106 as described above.

After one server 106 of the plurality of servers 106 is operational (e.g., has all corresponding portions of the solution stack installed and has booted into its operating system), the switch 102 may copy the network caching application to this operational server 106, thereby causing the operational server 106 to execute the network caching application and generate a network cache. The switch 102 may also copy contents of the network cache of the switch 102 to the network cache of the operational server 106. For example, if the operational server 106 was configured to have the entire solution stack installed, the switch 102 need not copy the contents of the network cache (e.g., the solution stack) to the operational server 106 as it is already stored in the operational server 106. The operational server 106 may then provide, to other servers 106 requesting portions of the solution stack during installation, portions of the solution stack from its network cache. Accordingly, the switch 102 may then delete the contents of the network cache from its storage. As the switch 102 has been operating within a firmware interface (e.g., the firmware interface application and/or network caching application), the switch 102 may complete its boot operation and/or reboot into its operating system, allowing the switch 102 then perform the network switching operations required to maintain the LAN 104.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Automatic server configuration by a switch in accordance with the present invention is generally implemented with computers, that is, with automated computing machinery. For further explanation, therefore, FIG. 2 sets forth a block diagram of automated computing machinery comprising an exemplary switch 102 configured for automatic server configuration by a switch according to embodiments of the present invention. The switch 102 of FIG. 2 includes at least one computer processor 202 or 'CPU' as well as random access memory 204 (RAM') which is connected through a high speed memory bus 206 and bus adapter 208 to processor 202 and to other components of the switch 102.

Figure 2:
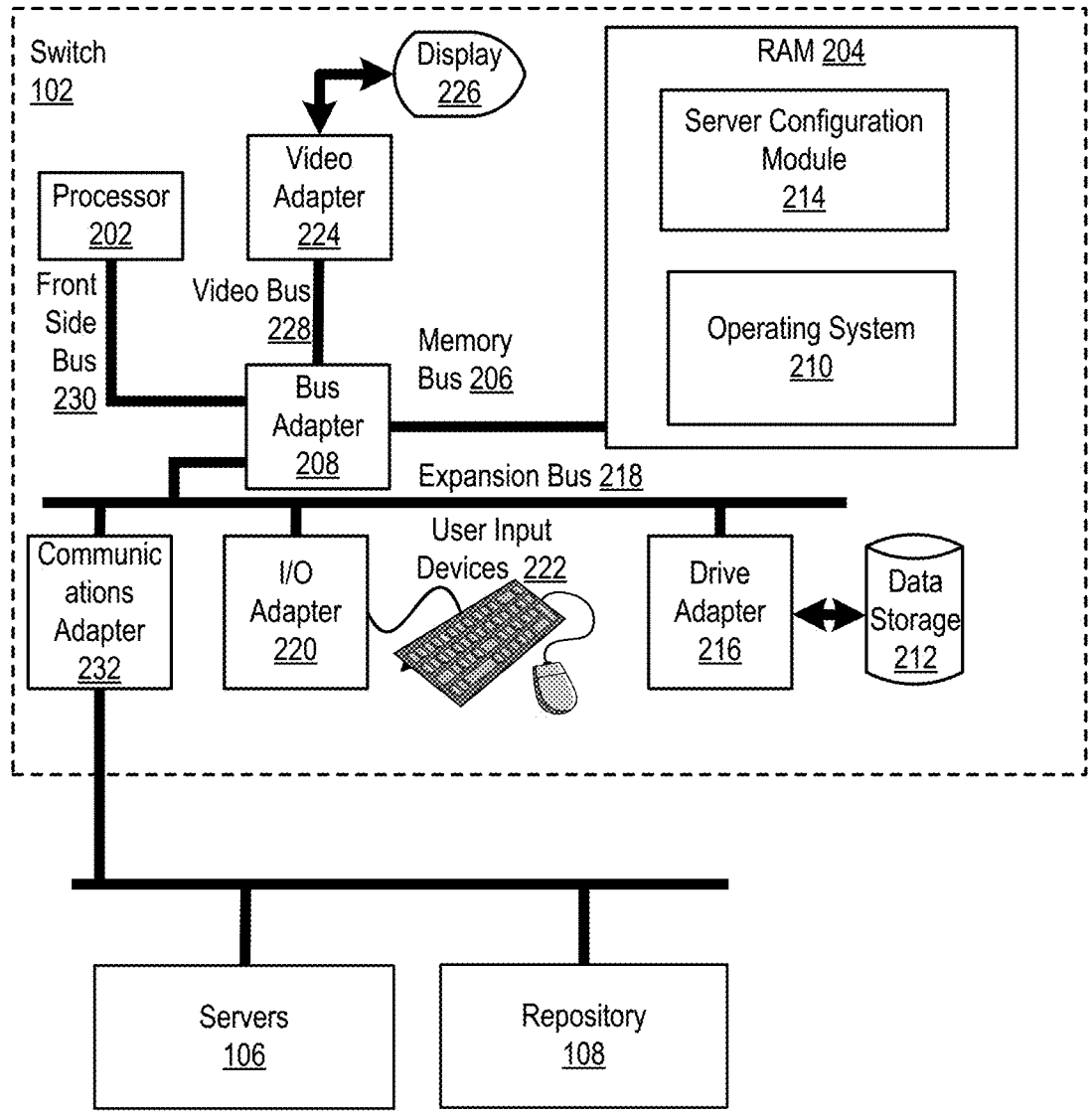
FIG. 2 is a block diagram of an example computing device configured for automatic server configuration by a switch.

Stored in RAM 204 is an operating system 210. Operating systems useful in computers configured for automatic server configuration by a switch according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the server configuration module 214, a module for automatic server configuration by a switch according to embodiments of the present invention (comprising, e.g., a firmware interface application and/or network caching application).

The switch 102 of FIG. 2 includes disk drive adapter 216 coupled through expansion bus 218 and bus adapter 208 to processor 202 and other components of the switch 102. Disk drive adapter 216 connects non-volatile data storage to the switch 102 in the form of data storage 212. Disk drive adapters useful in computers configured for automatic server configuration by a switch according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example switch 102 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example switch 102 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary switch 102 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for automatic server configuration by a switch according to embodiments of the present invention include modems for wired dial-up communications, Ethernet (IEEE 802.3) adapters for wired data communications, and 802.11 adapters for wireless data communications.

The communications adapter 232 is communicatively coupled to a network that also includes one or more servers 106 and a repository 108.

Figure 3:
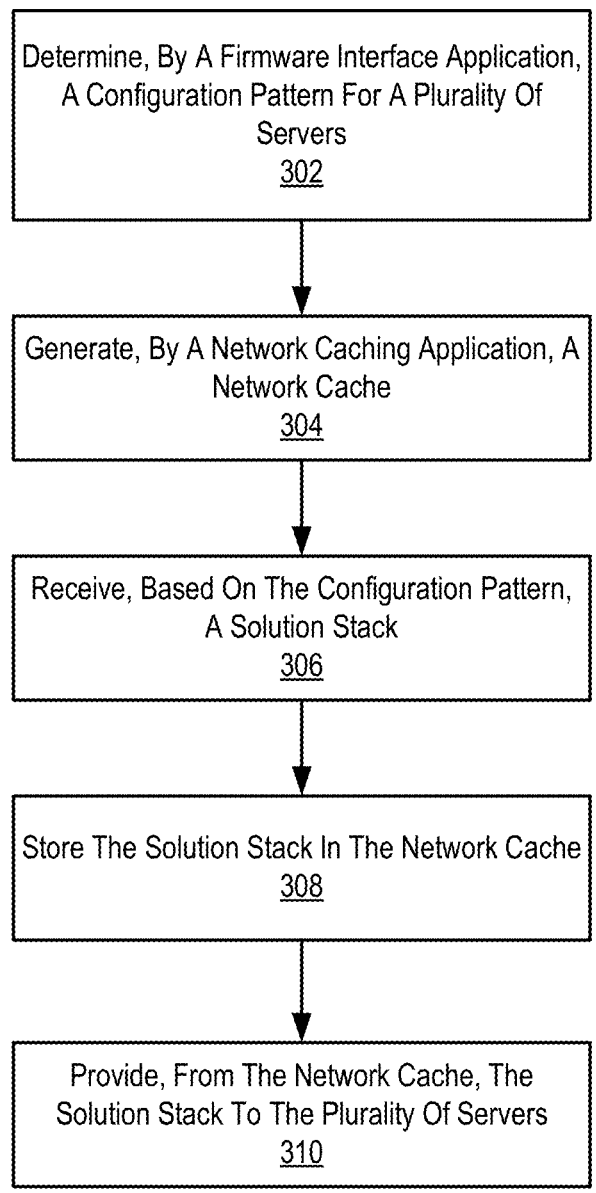
FIG. 3 is a flowchart of an example method for automatic server configuration by a switch.

For further explanation, FIG. 3 sets forth a flow chart illustrating an exemplary method for automatic server configuration using a switch according to embodiments of the present invention that includes determining 302, by a firmware interface application (e.g., of the switch), a configuration pattern for a plurality of servers 106. The switch may comprise a Top-of-Rack (ToR) switch. The configuration pattern indicates what software, operating systems, data, etc. are included in a particular solution stack for the servers 106. The configuration pattern may also indicate which portions of the solution stack should be installed on a particular server 106. The configuration pattern may also indicate disk configurations (e.g., Redundant Array of Independent Disk (RAID) configurations, partition configurations) for the servers 106. In other words, the configuration pattern describes the solution stack as it should be installed on the servers 106.

Determining the configuration pattern may comprise determining the configuration pattern by a firmware interface application of the switch 102. A firmware interface is a software program that connects the firmware of a computing device (e.g., the switch 102) to an operating system of the computing device. For example, the firmware interface may comprise a Universal Extensible Firmware Interface (UEFI). A firmware interface application is an application, module, service, or other functionality executed within the firmware interface (e.g., a UEFI application). As the firmware interface is launched when a device initially boots, before handoff to the operating system, the firmware interface application may be configured to be executed during the boot process of the switch 102.

Determining the configuration pattern may comprise receiving, via a user interface generated by the firmware interface application, one or more user inputs describing the configuration pattern. For example, the user interface may facilitate a selection of one or more operating systems, applications, services, etc. for inclusion in the solution stack of the servers 106. Determining the configuration pattern may also comprise selecting, according to a user input or a default selection, a predefined configuration pattern. The predefined configuration pattern may be stored on the switch 102 or a disk storage device communicatively coupled to the switch 102 (e.g., hard drives, network attached storage (NAS) drives, etc.). The predefined configuration pattern may also be stored in the repository 108. Accordingly, the firmware interface application may request, from the repository 108, a configuration pattern according to a user input or a default selection.

The method of FIG. 3 may further comprise generating 304, by a network caching application (e.g., of the switch 102), a network cache. The network cache comprises a data cache accessible by the one or more servers 106 and stored in the switch 102 or disk storage coupled to the switch 102. For example, the switch 102 may generate the network cache by a network caching application executed within the switch 102. The network caching application may comprise a firmware interface application (e.g., a UEFI application). The network caching application may also comprise a container (e.g., a Linux™ container), a kernel virtual machine (KVM), or another virtual machine. The network caching application may be preinstalled on the switch 102 (e.g., as a component of the UEFI, as stored in an EFI partition) or downloaded by the switch 102 via the network 110 (e.g., from the repository 108 or another source).

The method of FIG. 3 may further comprise receiving 306 (e.g., by the switch 102), based on the configuration pattern, a solution stack. Receiving the solution stack may comprise requesting the solution stack from the repository 108. For example, the switch 102 may determine, based on the configuration pattern, one or more operating systems, software applications, services, or other solution stack components and request the solution stack components from the repository 108. The repository 108 may then provide the determined solution stack components to the switch 102 as source code, binaries, archive files, bootable partitions (e.g., EFI partitions), etc. The switch 102 may also request a particular disk image (e.g., a "golden image") comprising the components of the solution stack from the repository 108.

The method of FIG. 3 may further comprise storing 308 (e.g., by the switch 102, via the network caching application and/or the firmware interface application) the solution stack in the network cache. The method of FIG. 3 may further comprise providing 310 (e.g., by the switch 102), from the network cache, the solution stack to the plurality of servers 106. Providing the solution stack to the servers 106 may comprise copying one or more bootable partitions to one or more of the servers 106 and then reboot the one or more servers 106. On reboot, the one or more servers 106 will load the bootable partitions which may initiate a boot chain for installing the respective portions of the solution stack for the one or more servers 106. For example, the boot chain initiated by the bootable partitions may cause the one or more servers 106 to request portions of the solutions stack (e.g., from the repository 108). As the solution stack is stored in the network cache of the switch 102, the switch 102 may then provide the requested portions of the solution stack from the network cache. Thus, the servers 106 avoid the computational and network overhead required in each server 106 communicating with the repository 108.

Figure 4:
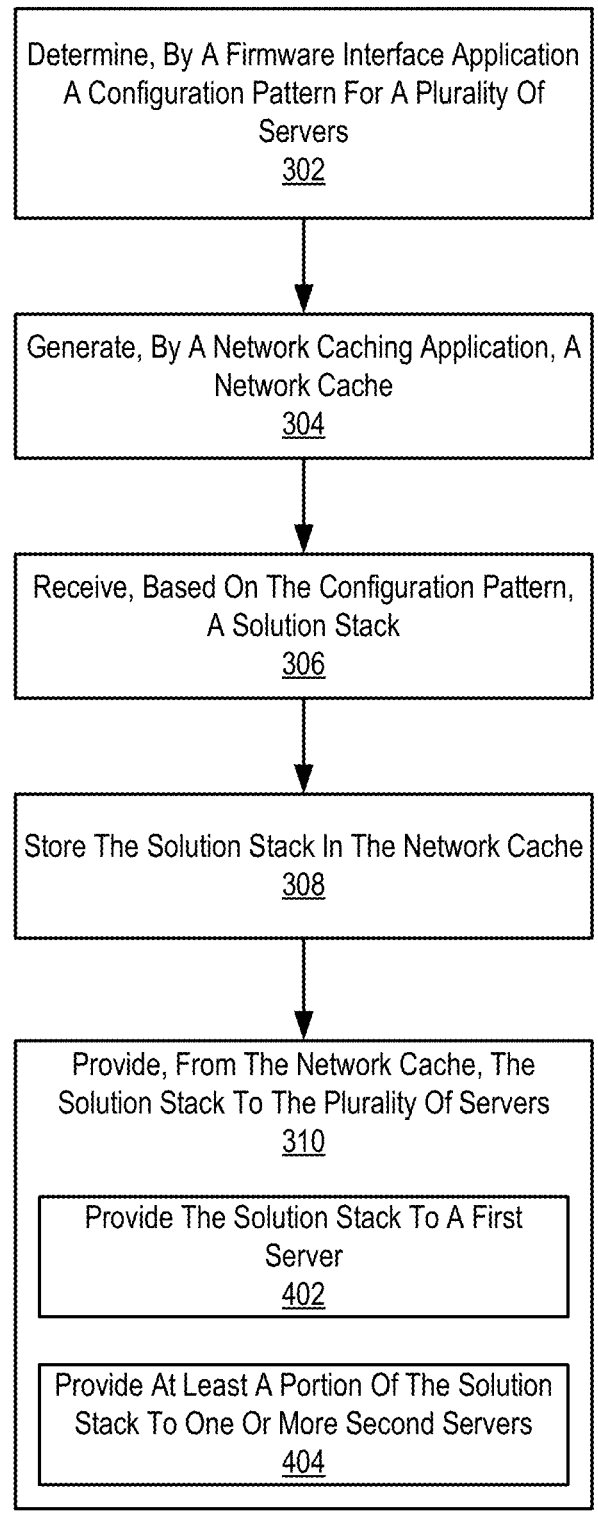
FIG. 4 is a flowchart of an example method for automatic server configuration by a switch.

For further explanation, FIG. 4 sets forth a flow chart illustrating a further exemplary method for automatic server configuration using a switch according to embodiments of the present invention that includes determining 302, by a firmware interface application, a configuration pattern for a plurality of servers 106; generating 304, by a network caching application, a network cache; receiving 306, based on the configuration pattern, a solution stack; storing 308 the solution stack in the network cache; and providing 310 the solution stack to the plurality of servers 106.

FIG. 4 differs from FIG. 3 in that providing the solution stack to the plurality of servers 106 comprises providing 402 the solution stack (e.g., the complete solution stack) to a first server 106 of the plurality of servers 106 and providing 404 at least a portion of the solution stack to one or more second servers 106 according to the configuration pattern. For example, the switch 102 may provide, to the first server 106, a disk image (e.g., a "golden image") comprising the complete solution stack. The switch 102 may also provide, to the first server 106, a bootable partition configured to initiate a boot chain installing the entire solution stack on the first server 106. The switch 102 may then copy bootable partitions or other data to the one or more second servers 106 to facilitate installation of the respective portions of the solution stack on the one or more second servers 106. The first server 106 and one or more second servers 106 may request portions of the solution stack which are provided by the switch 102 from the network cache. This further avoids the computational and network overhead required in each server 106 communicating with the repository 108.

Figure 5:
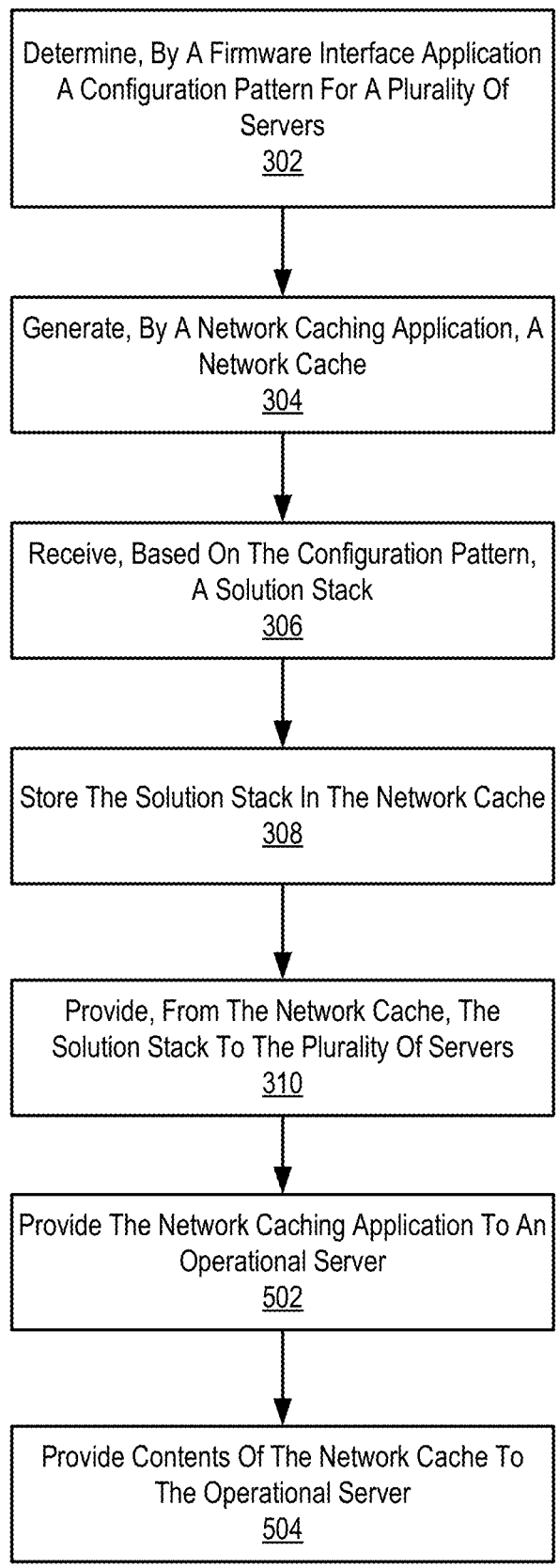
FIG. 5 is a flowchart of an example method for automatic server configuration by a switch.

For further explanation, FIG. 5 sets forth a flow chart illustrating a further exemplary method for automatic server configuration using a switch according to embodiments of the present invention that includes determining 302, by a firmware interface application, a configuration pattern for a plurality of servers 106; generating 304, by a network caching application, a network cache; receiving 306, based on the configuration pattern, a solution stack; storing 308 the solution stack in the network cache; and providing 310 the solution stack to the plurality of servers 106.

FIG. 5 differs from FIG. 3 in that the method of FIG. 5 further comprises providing 502 (e.g., by the switch 102) the network caching application to an operational server 106 (e.g., a server 106 that has all corresponding portions of the solution stack installed and has booted into its operating system), thereby causing the operational server 106 to execute the network caching application and generate a network cache. The method of FIG. 5 may further comprise providing 504 (e.g., by the switch 102) contents of the network cache of the switch 102 to the network cache of the operational server 106. For example, if the operational server 106 was configured to have the entire solution stack installed, the switch 102 need not copy the contents of the network cache (e.g., the solution stack) to the operational server 106 as it is already stored in the operational server 106. The operational server 106 may then provide, to other servers 106 requesting portions of the solution stack during installation, portions of the solution stack from its network cache. Accordingly, the switch 102 may then delete the contents of the network cache from its storage. As the switch 102 has been operating within a firmware interface (e.g., the firmware interface application and/or network caching application), the switch 102 may complete its boot operation and/or reboot into its operating system, allowing the switch 102 then perform the network switching operations required to maintain the LAN 104.

Figure 6:
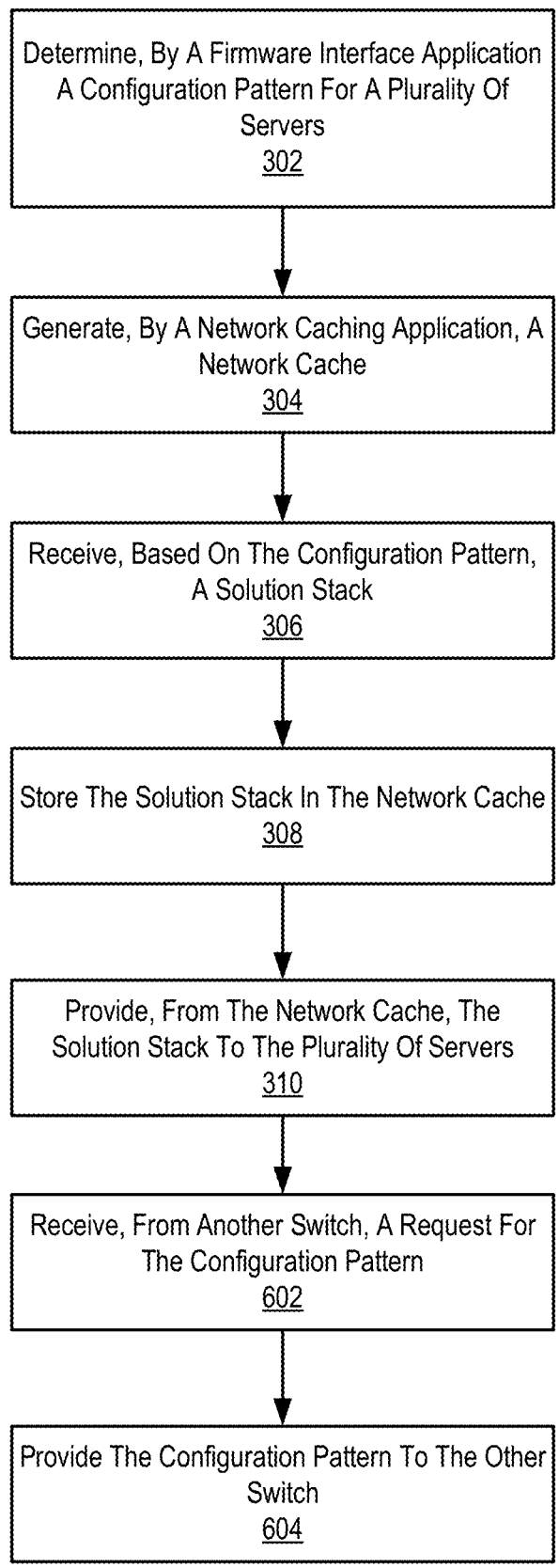
FIG. 6 is a flowchart of an example method for automatic server configuration by a switch.

For further explanation, FIG. 6 sets forth a flow chart illustrating a further exemplary method for automatic server configuration using a switch according to embodiments of the present invention that includes determining 302, by a firmware interface application, a configuration pattern for a plurality of servers 106; generating 304, by a network caching application, a network cache; receiving 306, based on the configuration pattern, a solution stack; storing 308 the solution stack in the network cache; and providing 310 the solution stack to the plurality of servers 106.

FIG. 6 differs from FIG. 3 in that the method of FIG. 6 further comprises receiving 602 (e.g., by the switch 102) a request from another switch 102 (e.g., a secondary switch 102 connecting another plurality of servers 106 in a rack configuration) for the configuration pattern. For example, the secondary switch 102 may be configured to automatically configure the other plurality of servers 106 according to the solution stack. The method of FIG. 6 may further comprise providing 604 (e.g., by the switch 102) the configuration pattern to the other switch 102. The other switch 102 may also request the solution stack (e.g., from the repository 108). The switch 102 may receive the request from the secondary switch 102 and provide the solution stack from the network cache. The other switch 102 may then provide the solution stack to the other plurality of servers 106 as described above.

In view of the explanations set forth above, readers will recognize that the benefits of automatic server configuration by a switch according to embodiments of the present invention include:

Increased simplicity in configuring a rack-based server configuration, eliminating the need for individual manual configuration of each server.

Reduced computational and network overhead by installing the solution stack from a network cache (e.g., on the switch or an operational server) when compared to each server installing respective portions of the solution stack from a remote repository.

Exemplary embodiments of the present invention are described largely in the context of a fully functional computer system for automatic server configuration using a switch. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of automatic server configuration by a switch, the method comprising:
   during a boot process of the switch:
      determining, by a firmware interface application of the switch, a configuration pattern for a plurality of servers;
      generating, by a network caching application of the switch, a network cache;
      receiving, based on the configuration pattern, a solution stack requested by the switch;
      storing the solution stack in the network cache;
      providing, from the network cache, the solution stack to the plurality of servers;
      providing, by the switch, a network caching application copy to an operational server of the plurality of servers;
   disabling the network caching application of the switch; and
   enabling networking switching operation of the switch.

2. The method of claim 1, wherein providing the solution stack to the plurality of servers comprises:
   providing the solution stack to a first server of the plurality of servers; and
   providing at least a portion of the solution stack to one or more second servers of the plurality of servers.

3. The method of claim 1, wherein the network caching application provided to the operational server of the plurality of servers comprises a virtual machine.

4. The method of claim 3, further comprising providing a copy of the network cache to the operational server.

5. The method of claim 1, further comprising:
   receiving, from another switch, a request for the configuration pattern; and
   providing, in response to the request, the configuration pattern to the other switch;
   wherein the other switch is configured to configure another plurality of servers based on the configuration pattern.

6. The method of claim 5, further comprising providing, to the other switch, from the network cache, the solution stack.

7. The method of claim 1, wherein determining, by the firmware interface application of the switch, the configuration pattern for the plurality of servers includes executing the firmware interface application during a boot process of the switch.

8. An apparatus for automatic server configuration by a switch, the apparatus comprising a computer processor, a computer memory operatively coupled to the computer processor, the computer memory having disposed within it computer program instructions that, when executed by the computer processor, cause the apparatus to perform steps comprising:
   during a boot process of the switch:
      determining, by a firmware interface application of the switch, a configuration pattern for a plurality of servers;
      generating, by a network caching application of the switch, a network cache;
      receiving, based on the configuration pattern, a solution stack requested by the switch;
      storing the solution stack in the network cache;
      providing, from the network cache, the solution stack to the plurality of servers;
      providing, by the switch, a network caching application copy to an operational server of the plurality of servers;
   disabling the network caching application of the switch; and
   enabling networking switching operation of the switch.

9. The apparatus of claim 8, wherein providing the solution stack to the plurality of servers comprises:
   providing the solution stack to a first server of the plurality of servers; and
   providing at least a portion of the solution stack to one or more second servers of the plurality of servers.

10. The apparatus of claim 8, wherein the network caching application provided to the operational server of the plurality of servers comprises a virtual machine.

11. The apparatus of claim 10, wherein the steps further comprise providing a copy of the network cache to the operational server, and wherein the operational server has booted into an operating system.

12. The apparatus of claim 8, wherein the steps further comprise:
   receiving, from another switch, a request for the configuration pattern; and
   providing, in response to the request, the configuration pattern to the other switch;
   wherein the other switch is configured to configure another plurality of servers based on the configuration pattern.

13. The apparatus of claim 12, wherein the steps further comprise providing, to the other switch, from the network cache, the solution stack.

14. The apparatus of claim 8, wherein the solution stack comprises an Extensible Firmware Interface (EFI) partition and/or a disk image.

15. A computer program product for automatic server configuration by a switch, the computer program product comprising a non-volatile computer readable medium and computer program instructions stored on the non-volatile computer readable medium, the computer program instructions configured to, when executed, cause the switch to perform steps comprising:
   during a boot process of the switch:
      determining, by a firmware interface application of the switch, a configuration pattern for a plurality of servers;
      generating, by a network caching application of the switch, a network cache;
      receiving, based on the configuration pattern, a solution stack requested by the switch;
      storing the solution stack in the network cache;
      providing, from the network cache, the solution stack to the plurality of servers;
      providing a network caching application copy to an operational server of the plurality of servers;
   disabling the network caching application of the switch; and
   enabling networking switching operation of the switch.

16. The computer program product of claim 15, wherein providing the solution stack to the plurality of servers comprises:
   providing the solution stack to a first server of the plurality of servers; and
   providing at least a portion of the solution stack to one or more second servers of the plurality of servers.

17. The computer program product of claim 15, wherein the network caching application provided to the operational server of the plurality of servers comprises a container, and wherein the operational server has booted into an operating system.

18. The computer program product of claim 17, wherein the steps further comprise providing a copy of the network cache to the operational server.

19. The computer program product of claim 15, wherein the steps further comprise:
   receiving, from another switch, a request for the configuration pattern; and
   providing, in response to the request, the configuration pattern to the other switch;
   wherein the other switch is configured to configure another plurality of servers based on the configuration pattern.

20. The computer program product of claim 19, wherein the steps further comprise providing, to the other switch, from the network cache, the solution stack.

* * * * *